United States Patent [19]

Kuriyama et al.

[11] Patent Number: 5,432,672
[45] Date of Patent: Jul. 11, 1995

[54] SOLID ELECTROLYTIC CAPACITOR

[75] Inventors: Chojiro Kuriyama; Yasuo Kanetake, both of Kyoto, Japan

[73] Assignee: Rohm Co., Ltd., Kyoto, Japan

[21] Appl. No.: 135,344

[22] Filed: Oct. 13, 1993

[30] Foreign Application Priority Data

Oct. 15, 1992 [JP] Japan ................................. 4-277400

[51] Int. Cl.⁶ .................... H01G 2/16; H01G 9/012
[52] U.S. Cl. ..................................... 361/534; 361/533
[58] Field of Search ............... 361/534, 532, 533, 540, 361/539, 538, 535, 523, 272, 274.1, 275.4; 29/25.03

[56] References Cited

U.S. PATENT DOCUMENTS

| | | | |
|---|---|---|---|
| 4,763,228 | 8/1988 | Su | 361/534 |
| 4,882,115 | 11/1989 | Schmickl | 361/538 |
| 5,053,927 | 10/1991 | Baker et al. | 361/534 |
| 5,216,584 | 6/1993 | Okazaki et al. | 361/534 |

FOREIGN PATENT DOCUMENTS

| | | | |
|---|---|---|---|
| 1241813 | 9/1989 | Japan | 361/535 |
| 2046715 | 2/1990 | Japan | 361/534 |
| 2112220 | 4/1990 | Japan | 361/534 |

Primary Examiner—Bruce A. Reynolds
Assistant Examiner—Gregory L. Mills
Attorney, Agent, or Firm—Nikaido, Marmelstein, Murray & Oram

[57] ABSTRACT

A solid electrolytic capacitor of the type having a built-in fuse is disclosed in which a connecting portion between the fuse and a capacitor element is made thin and securely formed to accommodate the capacitor element to be increased in capacitance without changing the outer size of a resin package. The solid electrolytic capacitor including a capacitor element, an internal anode lead extending from one surface of the capacitor element, other surfaces of the capacitor element serving as a cathode terminal wall, an external anode lead connected to the internal anode lead, an external cathode lead connected to the cathode terminal wall through a fuse, and a resin package encapsulating the capacitor element, the fuse and respective connecting portions of the external anode lead and the external cathode lead. A connecting portion between the fuse and one end of the external cathode lead lies adjacent the capacitor element and in or out of a plane coplanar with the surface of the cathode terminal wall to which the fuse is pressure-welded.

4 Claims, 2 Drawing Sheets

SOLID ELECTROLYTIC CAPACITOR

FIELD OF THE INVENTION

The present invention relates to solid electrolytic capacitors and, more particularly, to a solid electrolytic capacitor of the type having a built-in fuse which accommodates its capacitor element to be increased in size without changing the size of its resin package.

BACKGROUND OF THE INVENTION

In a conventional solid electrolytic capacitor having a built-in fuse, the fuse is positioned by being once extended upward from a cathode terminal wall of a capacitor element to form a loop and connected to an external lead (or wire) situated adjacent a central portion of the capacitor element. This results in a limitation in decreasing the size of a resin package of the capacitor. In an attempt to decrease the package size, a capacitor structure as shown in FIG. 3 has been proposed.

In FIG. 3, an internal anode lead 22 projecting from one lateral surface of a capacitor element 21 is connected at its end to an external lead 23; a fuse-supporting plate 25 is connected at its one end to a cathode terminal wall 24, or an outer wall of the capacitor element 21; a fuse 26 is electrically connected between the other end of the fuse-supporting plate 25 and an external lead 27; and the capacitor element 21 together with a portion of each of the external leads 23 and 27 is encapsulated with a resin package 28 by molding. As shown in perspective at FIG. 4, the fuse-supporting plate 25 and the external lead 27 are disposed offset to each other in plan so as to allow easy connection therebetween through the fuse 26.

In this proposed solid electrolytic capacitor, however, distance A (refer to FIG. 3) between the cathode terminal wall 24 to which the fuse 26 is pressure-welded and the outer wall of the resin mold package 28 is only about 0.3 mm even terms of design center value. This causes a problem that disposing the fuse-supporting plate 25 and fuse 26 within distance A will result in exposure of the fuse 26 from the resin package or in a like fault. The fuse-supporting plate 25 is about 1 mm thick on the average and the fuse 26 is 0.1 to 0.12 mm in diameter. Accordingly, an extent of about 0.2 to 0.22 mm of distance A (about 0.3 mm) is occupied only by the two components.

Further, distance A is so small that it becomes a bottleneck in increasing the size of the capacitor element 21 and, hence, a solid electrolyte capacitor of larger capacitance is difficult to realize.

SUMMARY OF THE INVENTION

The present invention has been attained to overcome the foregoing problems. It is, therefore, a primary object of the present invention to provide a solid electrolytic capacitor in which a fuse connecting portion is made thin to accommodate a capacitor element of larger size without changing the size of a resin package.

According to the present invention, there is provided a solid electrolytic capacitor comprising a capacitor element, an internal anode lead extending from one surface of the capacitor element, other surfaces of the capacitor element serving as a cathode terminal wall, an external anode lead connected to the internal anode lead, an external cathode lead connected to the cathode terminal wall through a fuse, and a resin package encapsulating the capacitor element, the fuse and respective connecting portions of the external anode lead and the external cathode lead, wherein the connecting portion between the fuse and one end of the external cathode lead lies adjacent the capacitor element and in or out of a plane coplanar with the surface of the cathode terminal wall to which the fuse is pressure-welded.

Preferably, the external cathode lead is provided at its end portion with a spring portion which urges the connecting portion between the fuse and the external cathode lead toward the outside of the aforesaid plane.

It is preferable that the fuse is a plate fuse.

It is preferable that a distance between the plane coplanar with the surface of the cathode terminal wall and the connecting portion is in the range of 0 to 0.2 min.

In the present invention the connecting portion between the fuse and the end portion of the external cathode lead is made to lie adjacent the capacitor element and in or out of the plane coplanar with the surface of the cathode terminal wall to which the fuse is pressure-welded. This feature eliminates the need of bending the fuse and allows a compressive force to work on the pressure-welded portion between the fuse and the cathode terminal wall. As a result, exfoliation of the pressure-welded portion is hard to occur. Further, because of the fuse having no bending portion, the fuse will never be outwardly extended than expected thereby assuring a of stable quality solid electrolytic capacitor with a resin package wall thereof made thin.

Further, if the spring portion is formed in the end portion of the external cathode lead to urge the connecting portion between the external cathode lead and the fuse toward the outside of the aforesaid plane, a larger compressive force is exerted on the aforesaid pressure-welded portion, resulting in more reliable pressure-welding.

DETAILED DESCRIPTION

A solid electrolytic capacitor according to the present invention will now be described with reference to the drawings.

Figure 1:
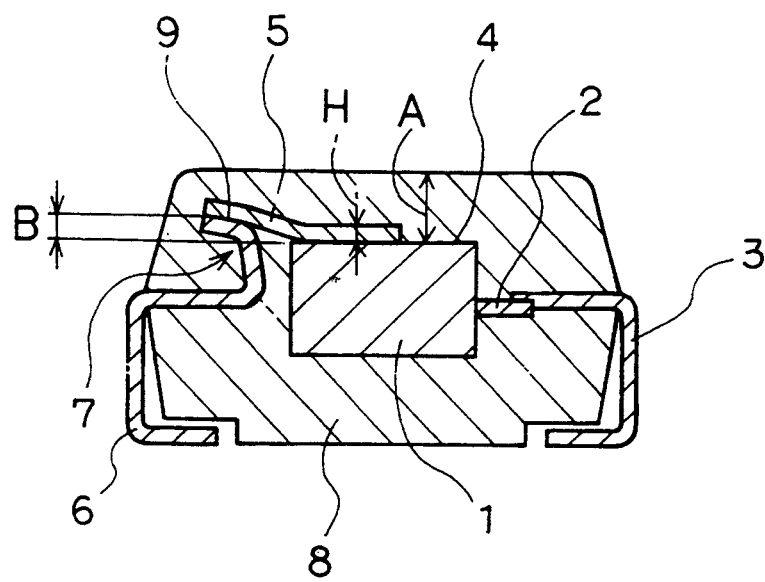
FIG. 1 is an explanatory section showing one embodiment of a solid electrolytic capacitor according to the present invention.
Figure 2:
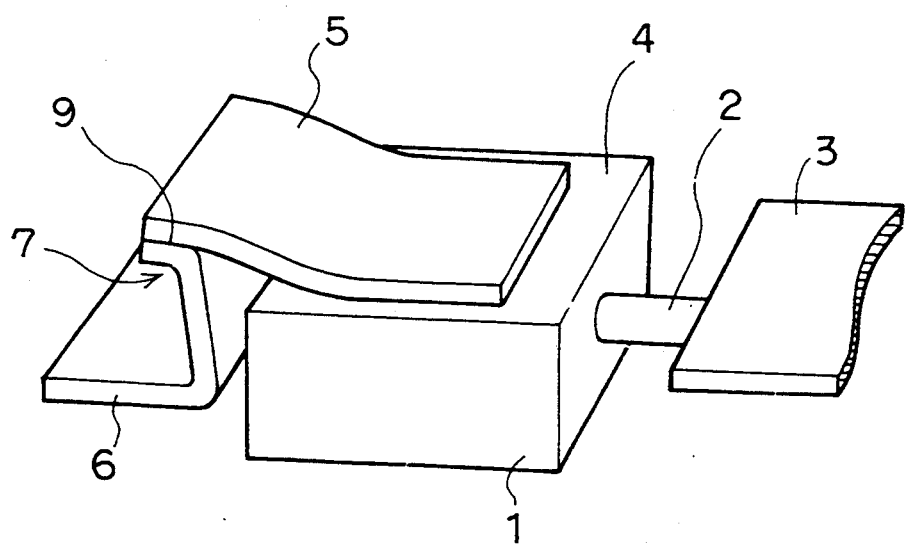
FIG. 2 is an enlarged fragmentary view showing in perspective the main part of the solid electrolytic capacitor of FIG. 1.
Figure 3:
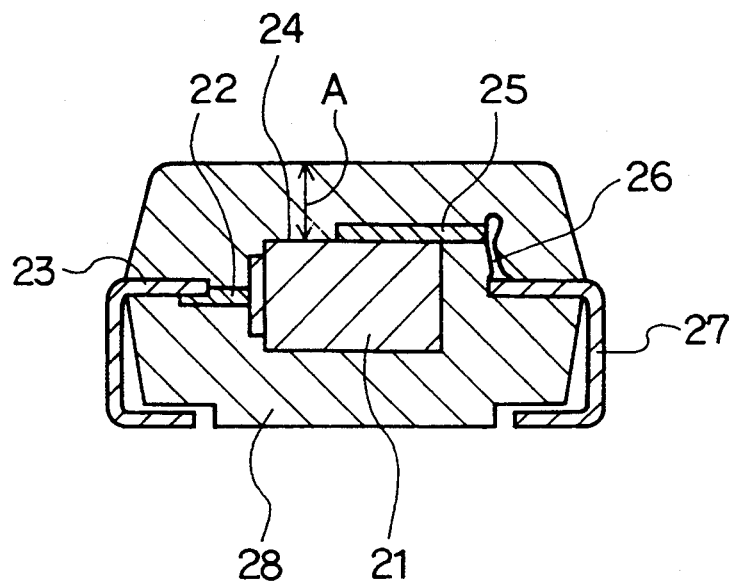
FIG. 3 is a sectional view showing a prior art solid electrolytic capacitor.
Figure 4:
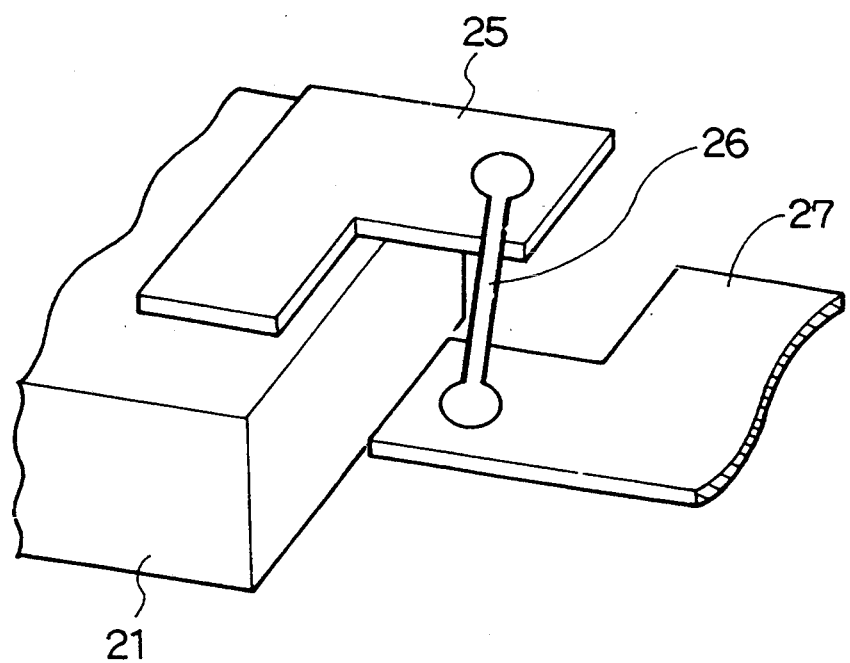
FIG. 4 is an enlarged fragmentary view showing in perspective the fuse-connecting portion of the prior art solid electrolytic capacitor.

A tantalum electrolytic capacitor as one embodiment of the present invention is of the construction shown in FIGS. 1 and 2. A capacitor element 1 is formed of a sintered body of, for example, tantalum powder. From one lateral surface of the capacitor element 1 is extending an internal anode lead 2 which is connected at its end to an external cathode lead 3. The other surfaces of the capacitor element 1 are covered with a silver film or a like film to form a cathode terminal wall 4 which is electrically connected to an external cathode lead 6 through a plate fuse 5. The capacitor element 1 together with its associated connecting portions at respective ends of the external leads 3 and 6 is encapsulated with a resin package 8 by molding.

The present invention is characterized in that a connecting portion 9 forming an end portion of the external cathode lead 6 and connected to the fuse 5 by pressure-welding lies adjacent the capacitor element 1 and in or out of a plane coplanar with the surface of the cathode terminal wall 4 of the capacitor element 1 to which the plate fuse 5 is pressure-welded. If the connecting portion 9 of the external cathode lead 6 is located below the surface of the cathode terminal wall 4 to which the plate fuse 5 is pressure-welded, the plate fuse 5 must be extended once upward to form a loop and led downward to connect to the external cathode lead 6. This is because extending the fuse 5 directly downward causes the fuse 5 to be cut off easily, resulting in unstable behavior of the fuse 5. Alternatively, extending the fuse 5 once upward to form a loop results in an increased distance (distance A in FIG. 1) between the outer surface of the capacitor element 1 and the outer wall of the resin package 8. Hence, the resultant solid electrolytic capacitor cannot be reduced in size. On the contrary, in the present embodiment the connecting portion 9 between the end portion of the external cathode lead 6 and the fuse 5 is located adjacent the capacitor element 1 and out of (above in FIG. 1) the plane coplanar with the surface of the cathode terminal wall 4 to which the fuse 5 is pressure-welded. Hence, there is no need to bend the plate fuse 5 or extend the same to form a loop. Further, since the connecting portion 9 is located above the plane coplanar with the surface of the cathode terminal wall 4 to which the fuse 5 is pressure-welded, a compressive force is exerted between the capacitor element 1 and the fuse 5 thereby preventing the fuse 5 from exfoliating from the capacitor element 1, leading to increased reliability. Even if the connecting portion 9 at the end of the external cathode lead 6 is located in the plane coplanar with the surface of the cathode terminal wall 4 to which the fuse 5 is pressure-welded, no tensile force is exerted on the pressured-welded surface of the capacitor element 1 and, hence, the same effect as above can be performed. Note that the distance (distance B in FIG. 1) between the connecting portion 9 and the plane coplanar with the surface of the cathode terminal wall 4 to which the fuse 5 is pressure-welded is preferably within the range of from 0 to 0.2 ram, more preferably 0 to 0.1 mm. This is because although a larger distance as distance B is more preferable from the viewpoint of providing a better pressure-welding of the plate fuse 5 against the cathode terminal wall 4 of the capacitor element 1, smaller distance as distance B is more preferable from the viewpoint of reducing the package in size. If distance B is 0.1 mm or smaller, then the sum of thickness of the plate fuse 5 (about 0.1 mm) and distance B is 0.2 mm or smaller. Accordingly, the thickness of the resin package (distance A) can be set to 0.3 mm or smaller.

In the present embodiment the external cathode lead 6 is imparted with a spring function by bending its end portion to be L-shaped to form a spring portion 7 as shown in FIG. 1. This feature advantageously allows the plate fuse 5 to be pressed against the capacitor element 1 even if the aforesaid distance B is set to almost 0. The spring portion 7 may be V-shaped or reversed L-shaped instead of being L-shaped.

Although a plate fuse is used as the fuse in the present embodiment, any type of fuse, for example a fuse in the form of wire, is usable in the present invention.

According to the present invention, as has been described, the electrically connecting portion between the cathode terminal wall of the capacitor element and the fuse can be made thin. Hence, even if the resin package is made thin, there can be prevented faults such as exposure of a built-in fuse. This allows the solid electrolytic capacitor element to be increased in size without changing the size of the resin package. As a result, a capacitor of larger capacitance can be realized without changing the size of the outward form thereof.

Further, since the connecting portion between the external lead and the fuse is located out of the plane coplanar with the surface of the cathode terminal wall to which the fuse is pressure-welded, a larger compressive force is exerted on the pressure-welded portion between the fuse and the cathode terminal wall thereby assuring a higher reliability of pressure welding.

Still further, the provision of the spring portion in the end portion of the external cathode lead causes additional compressive force to be exerted on the pressure-welded portion between the fuse and the cathode terminal wall, thus leading to more reliable pressure-welding.

Though several embodiments of the present invention are described above, it is to be understood that the present invention is not limited only to the above-mentioned, various changes and modifications may be made in the invention without departing from the spirit and scope thereof.

What is claimed is:

1. A solid electrolytic capacitor comprising:
   a capacitor element;
   an internal anode lead extending from one surface of the capacitor element;
   other surfaces of the capacitor element serving as a cathode terminal wall;
   an external anode lead connected to the internal anode lead;
   an external cathode lead connected to the cathode terminal wall through a fuse; and
   a resin package encapsulating the capacitor element, the fuse and respective connecting portions of the external anode lead and the external cathode lead, wherein the connecting portion between the fuse and one end of the external cathode lead lies adjacent the capacitor element and one of a) in and b) out of a plane which is coplanar with the surface of the cathode terminal wall to which the fuse is pressure-welded and wherein said external cathode lead is provided at its end portion with a spring portion which urges the connecting portion between the fuse and the external cathode lead toward an outside of said plane.

2. The solid electrolytic capacitor of claim 1, wherein said fuse is a plate fuse.

3. The solid electrolytic capacitor of claim 1, wherein a distance between said plane which is coplanar with the surface of said cathode terminal wall and said connecting portion is in a range of 0 to 0.2 mm.

4. A solid electrolytic capacitor comprising:
   a capacitor element;
   an internal anode lead extending from one surface of the capacitor element;
   other surfaces of the capacitor element serving as a cathode terminal wall;
   an external anode lead connected to the internal anode lead;
   an external cathode lead connected to the cathode terminal wall through a fuse; and a resin package encapsulating the capacitor element, the fuse and respective connecting portions of the external anode lead and the external cathode lead, wherein the connecting portion between the fuse and one end of the external cathode lead lies adjacent the capacitor element and above a plane which is coplanar with the surface of the cathode terminal wall to which the fuse is pressure-welded and wherein said external cathode lead is provided at its end portion with a spring portion which urges the connecting portion between the fuse and the external cathode lead toward an outside of said plane.

* * * * *